United States Patent [19]

Barr

[11] Patent Number: 4,878,403

[45] Date of Patent: Nov. 7, 1989

[54] MANUFACTURE OF ROTARY DRILL BITS

[75] Inventor: John D. Barr, Cheltenham, England

[73] Assignee: Reed Tool Company Limited, Monkstown, Northern Ireland

[21] Appl. No.: 266,096

[22] Filed: Nov. 2, 1988

[30] Foreign Application Priority Data

Nov. 3, 1987 [GB] United Kingdom ............... 8725668

[51] Int. Cl.$^4$ ............................................... B21K 5/20
[52] U.S. Cl. ............................ 76/107 R; 76/108 A; 409/132
[58] Field of Search ............ 76/107 R, 101 R, 101 E, 76/108 A; 1/DIG. 11, DIG. 12; 409/131, 132; 408/1 R

[56] References Cited

U.S. PATENT DOCUMENTS 3,863,525  2/1975  Cale ........................................ 409/131
4,529,047  7/1985  Meskin ................................... 175/410

Primary Examiner—Roscoe V. Parker
Attorney, Agent, or Firm—Browning, Bushman, Zamecki & Anderson

[57] ABSTRACT

In the manufacture of a bit body by a powder metallurgy process, a hollow mold is formed in the configuration of at least a portion of the outer surface of the bit body, and elongate pockets of generally V-section are then formed in the interior surface of the mold, to receive portions of thermally stable cutting elements, each of which is of generally triangular cross-section with a flat front face. Each pocket is machined from the mold material by means of a conical tool rotating about its axis, the axis being inclined to the perpendicular in a plane containing the required longitudinal axis of the pocket. The main elongate part of the pocket is formed by translatory movement of the tool along the axis of the pocket, and a flat, generally triangular, end face is then formed by translatory movement of the tool transversely of the axis of the pocket.

5 Claims, 2 Drawing Sheets

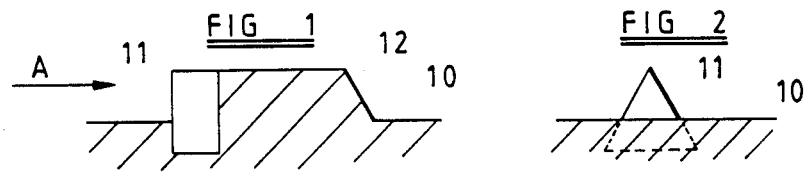
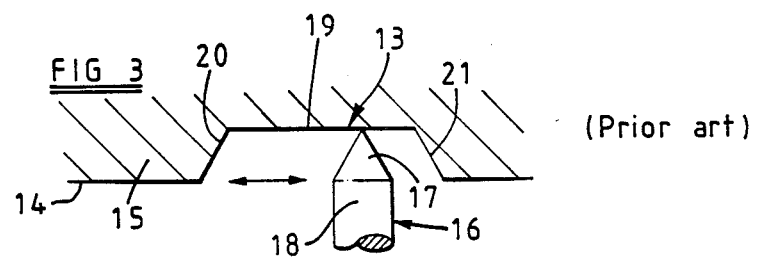
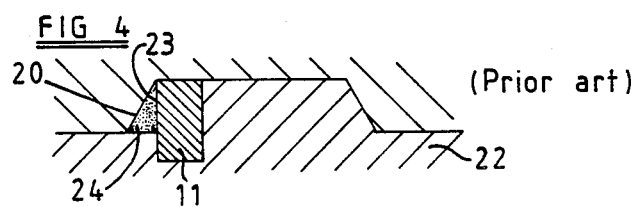
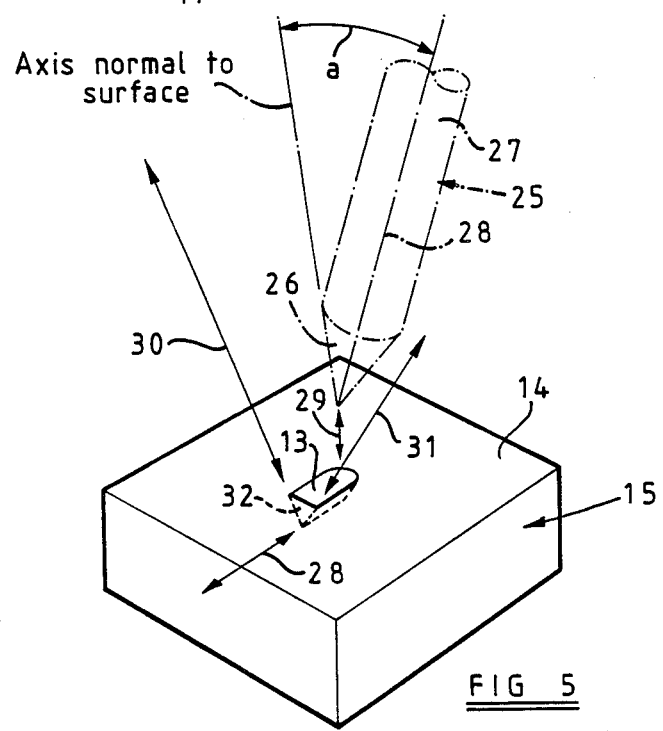

MANUFACTURE OF ROTARY DRILL BITS

BACKGROUND OF THE INVENTION

The invention relates to the manufacture of rotary drill bits for use in drilling or coring deep holes in subsurface formations. In particular, the invention is applicable to rotary drill bits of the kind comprising a bit body having a shank for connection to a drill string and an inner channel for supplying drilling fluid to the face of the bit, and where the bit body carries a plurality of so-called preform cutting elements, each element having a hard cutting face formed of polycrystalline diamond or other superhard material.

In one commonly used method of making rotary drill bits of the above-mentioned type, the bit body is formed by a powder metallurgy process. In this process a hollow mould is first formed, for example from graphite, in the configuration of the bit body or a part thereof. The mould is packed with powdered matrix-forming material, such as tungsten carbide, which is then infiltrated with a metal alloy, such as a copper alloy, in a furnace so as to form a hard matrix.

Polycrystalline diamond preforms are available which are thermally stable up to the infiltration temperature, typically about 1100° C. Such thermally stable diamond materials are supplied, for example, by the General Electric Company under the trade name "GEOSET", and by DeBeers under the trade name "SYNDAX 3". Such materials may be mounted in the surface of the bit body, in the infiltration process, by locating the thermally stable performs in pockets formed in the interior surface of the mould, and then packing the matrix-forming material around the preforms.

One common form of thermally stable preform comprises a thick tablet of triangular shape and of constant cross-section. Another is of cubic shape. A desirable arrangement for such preforms at the bit body surface is for the preform to be so mounted in the surface that one apex of the triangle, or one corner of the cube, projects from the surface of the drill bit, the general plane of the triangle, or face of the cube, extending generally radially with respect to the central axis of rotation of the bit. Behind the preform is an upstanding tooth comprising a portion of the matrix body of the bit which is of the same general V-section as the projecting portion of the preform and which extends rearwardly thereof to provide back support for the preform. In order to form such a support during moulding of the bit body, the pocket in the mould in which each preform is located is elongate and of generally V-section. The preform is then located adjacent one end of the pocket so that the rest of the pocket fills with matrix-forming material to provide the upstanding tooth on the finished bit body.

The pockets in the mould may conveniently be formed by automatic machining operations under computer control. However, problems arise in conveniently forming, in such computer controlled machining operations, pockets of the required shape to receive thermally stable preforms of the kind referred to above. Since the elongnate pocket is of V-section it is most conveniently machined by use of a rotating conical forming tool which extends perpendicularly to the interior surface of the mould and is traversed along the required longitudinal axis of the pocket. However, such a method results in an elongate V-sectioned pocket which is concavely curved, in semi-conical manner, at its two ends. Accordingly, since the triangular preform has flat faces, when the preform is located in the pocket adjacent one end, there is a semi-conical gap between the front face of the preform and the adjacent curved end of the pocket. If this gap is allowed to fill with matrix-forming material during the process of moulding the bit body, this will result, in the finished drill bit, in their being an upstanding pad of matrix in front of the preform, as well as the required elongate matrix back support on the rearward side of the preform. Such an arrangement is shown, for example, in U.S. Pat. No. 4,529,047.

This may be undesirable in that it may interfere with the effective cutting operation of the preform. It has been proposed to overcome this problem by filling the gap in the pocket in the mould with some removable filler before the mould is packed with matrixforming powder, but this involves extra labour, and hence cost in preparing the mould for the infiltration process.

It is therefore desirable to be able to machine in the mould, using a computer controlled tool, an elongate pocket of general V-section which has at one end a flat end face against which the front face of the preform may abut when the preform is located in the pocket, so that matrix-forming material then only fills the pocket on the rearward side of the preform. The present invention provides a method of forming such pockets.

SUMMARY OF THE INVENTION

According to the invention there is provided a method of making a mould for use in the manufacture of a bit body by a powder metallurgy process, the method comprising the steps of forming a hollow mould in the configuration of at least a portion of the outer surface of the bit body, and then forming inthe interior surface of the mould a plurality of elongate pockets, each of which pockets is at least partly to receive a portion of a thermally stable cutting element, which portion has sloping longitudinal sides and a flat transverse front face, characterized in that each said pocket is machined from the mould material by means of a conical tool rotating about its axis, said axis being inclined to the perpendicular in a plane containing the required longitudinal axis of the pocket, a main elongate part of the pocket then being formed by translatory movement of the tool longitudinally thereof, and the pocket being formed with a flat transverse end face by translatory movement of the tool transversely of the longitudinal axis of the pocket.

Each elongate pocket may be of generally V-section, so as at least partly to receive a generally triangular cross-section portion of a thermally stable cutting element.

Preferably the axis of rotation of the tool is inclined to the perpendicular at an angle substantially equal to the cone semi-angle of the tool so that a leading generator of the cone is substantially perpendicular to the surface of the mould, whereby the flat end face of the pocket, formed by said transverse movement of the tool, also extends substantially at right angles to the mould surface.

One common form of thermally stable preform is in the shape of an equilateral triangle of constant thickness, so that the required angle for the V-section of the pocket is 60°. In order to achieve this by the method according to the invention, the tool should have a cone semi-angle of 26.565° and be inclined at a similar angle to the perpendicular in a plane containing the required longitudinal axis of the pocket.

The invention includes within its scope the method as described above when followed by the further steps of the powder metallurgy process, that is to say the steps of locating thermally stable preforms in the pockets adjacent the flat end faces thereof, packing the mould with powdered matrix-forming material, and then infiltrating the material with a metal alloy in a furnace so as to form a hard matrix.

The invention also includes within its scope a bit body when formed using methods in accordance with the invention.

BRIEF DESCRIPTION OF THE DRAWINGS

FIG. 1 is a diagrammatic section through part of a bit body showing the mounting of a thermally stable preform at the surface of the bit body, FIG. 2 is a view in the direction of arrow 2 in FIG. 1, FIG. 3 illustrates diagrammatically a step in a prior art method of forming a pocket in a mould to receive such a preform, FIG. 4 shows a further step in the prior art method, FIG. 5 is a diagrammatic perspective view illustrating the method according to the present invention.

DETAILED DESCRIPTION OF THE PREFERRED EMBODIMENTS

Figure 6:
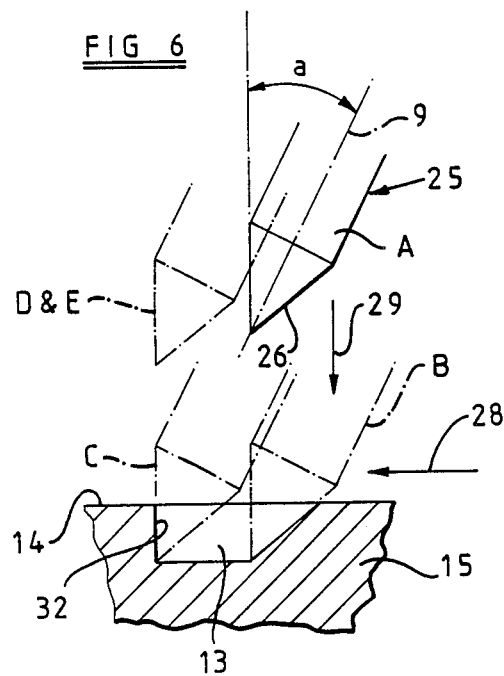
FIG. 6 is a longitudinal section through a pocket showing some of the steps in the method of forming the pocket according to the invention.

Referring to FIG. 1, the bit body of matrix material is indicated at 10 and embedded partly in the bit body is a thermally stable preform 11. As best seen in FIG. 2, the preform is in the shape of an equilateral triangle of constant thickness and is embedded in the bit body so that one apex of the triangle projects from the surface of the bit body. Rearwardly of the preform, with respect to the normal direction of forward movement of the preform cutting element during rotation of the bit, is an upstanding tooth or support 12 of matrix material. The tooth is also of V-section so that its sides are flush with the projecting surfaces of the preform. The end of the tooth remote from the preform is curved in semi-conical manner.

As previously described, the preform is mounted in the bit body, and the tooth 12 is formed, by forming the interior surface of the mould in which the bit body is formed with an elongate V-section pocket in which the preform is located during the moulding process. FIGS. 3 and 4 illustrate a conventional prior art method of forming such a pocket.

As shown in FIG. 3, the pocket 13 in the surface 14 of the mould 15 is machined by using a tool 16 having a conical tip 17, for example of tungsten carbide, on a shank 18, for example of steel.

The tool 16 is orientated with its central axis of rotation perpendicular to the surface 14 of the mould and the pocket 13 is formed by traversing the rotating tool longitudinally of the required longitudinal axis of the pocket. This results in the pocket having a main central portion 19 which is V-shaped in cross-section and end portions 20 and 21 which are semi-conical in shape.

FIG. 4 shows a later stage in the manufacture of the bit where the preform 11 has been inserted in the pocket adjacent the end 20 and the mould has been filled with matrix-forming material 22, prior to infiltration of the material to form the matrix. It will be seen that, due to the shape of the pocket 13, there is a semi-conical gap adjacent the front face 23 of the preform 11, and in order to prevent this gap being filled with matrix, it is necessary to fill it with some other material, such as clay 24, before the matrix-forming material is introduced into the mould.

It is therefore desirable to be able to machine conveniently a pocket which is generally of the configuration shown in FIGS. 3 and 4 but which is formed at one end with a flat end face against which the flat face 23 of the preform may abut. FIG. 5 shows a method of forming such a pocket, in accordance with the invention.

In this case a rotating tool 25 is again provided which has a conical tip 26 and a shank 27. In the method according to the invention, however, the axis of rotation 9 of the tool is not perpendicular to the surface 14 of the mould 15 but is inclined at an angle a to the perpendicular, in a plane containing the required longitudinal axis of the pocket 13. The possible paths of translatory movement of the tool 25, under the control for example of a computer, are indicated by the arrows 28, 29, 30 and 31.

The main longitudinal V-section part of the pocket is formed by selective translatory movement of the tool in the direction of the arrows 28 and 29, as will be described in relation to FIG. 6. By translatory movement of the tool selectively in the directions of the arrows 30 and 31, when the tool is at one end of the pocket, the pocket is formed with a flat triangular end face as indicated at 32, without alteration of the orientation of the axis 9 of the tool, as will be described in relation to FIG. 7.

As best seen in FIG. 6, the angle of inclination a of the axis 9 of the tool is equal to the cone semi-angle of the cutting tip 26 of the tool so that the leading generator of the cone extends perpendicularly into the surface 14 of the mould, with the result that the face 32 is formed at right angles to the face 14 of the mould.

In order to achieve a V-section shape for the pocket 13 having an angle of 60°, so as to receive a preform of equilateral triangular shape, the cone semi-angle of the tool tip requires to be less than 30°, in order to take into account the inclination of the tool. It can be shown that the relationship between the required semi-angle b of the pocket and the semi-angle a of the tool required to form such a pocket is given by the solution of the following equation:

$$\cos a \sqrt{[(\tan^2 2a)/4 + 1/\cos^2 b]} - 1/\cos a - [(\tan 2a)/2 - \tan a]\sin a = 0$$

In the case where the preform is in the shape of an equilateral triangle, the required semi-angle b of the V-section of the pocket is 30°. Using the above formula, this gives a required semi-angle a for the tool tip of 26.565°.

Figure 7:
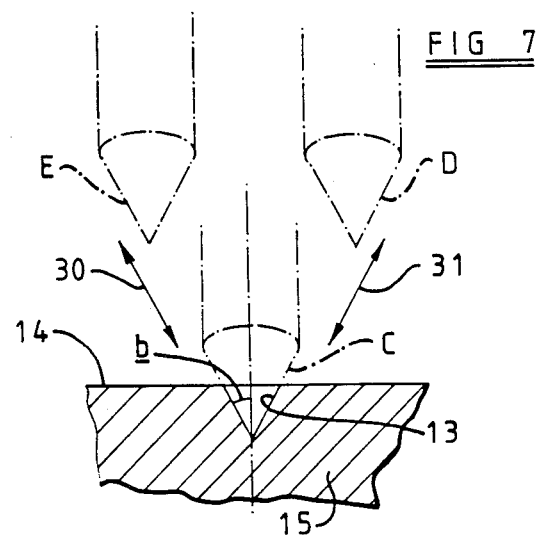
FIG. 7 is a transverse section through the pocket showing further steps in the method.

As previously mentioned, FIGS. 6 and 7 illustrate the sequential steps in the formation of the pocket 13 by the method according to the invention. Referring to FIG. 6, the tool 25 is initially in the position indicated at A and, while rotating, is advanced perpendicularly to the surface 14 of the mould 15, in the direction of arrow 29, to the position indicated in chain lines at B, the conical cutting tip of the tool cutting into the surface of the mould.

The rotating tool is then advanced, in the direction of arrow 28, parallel to the surface 14 of the mould in the direction of the required longitudinal axis of the pocket, thus cutting the main part of the pocket. This main part of the pocket will be generally V-shaped in cross-section, the semi-angle of the V-shape being 30°, as previously explained. This brings the tool to the position indicated in chain lines at C in FIG. 6 and FIG. 7.

Referring now to FIG. 7, which is a transverse section of the pocket at right angles to the longitudinal axis thereof, the tool 25, still at the same angle of inclination a to the vertical, is then moved upwardly and laterally with respect to the pocket, in the direction of arrow 31 in FIG. 7, to bring the tool to the position indicated in chain lines at D in FIG. 7. The direction of movement 31 is inclined at 30° to the normal to the surface 4. During this movement the tool 25 forms the right hand portion (as viewed in FIG. 7) of the flat triangular end face 32 of the pocket, the point of the tool forming the right angle between the end face 32 and the inclined longitudinal right hand side wall of the pocket as the tool is withdrawn.

The tool is then returned from position D to position C once again, in the direction of the arrow 31, before being moved upwardly and transversely in the direction of the arrow 30 in FIG. 7, which is also inclined at 30° to the normal to the surface 14 of the mould. The tool thus moves from position C to position E, indicated in chain lines in FIG. 7, and during this movement the tool forms the left hand portion of the flat end face 32 of the pocket 13. This completes the formation of the pocket.

As may be seen from FIG. 6, as the tool is moved in the direction of the arrows 30 and 31 to and from the position D and then to the position E, the leading generator of the conical tip of the tool moves in a plane which is normal to the surface 14 of the mould and is at right angles to the longitudinal axis of the pocket 13, so as to provide a flat end face 32 which is also normal to the surface 14 and at right angles to the longitudinal axis of the pocket. However, as previously mentioned, it is not essential for the flat end face 32 to be normal to the surface 14 and it could be inclined thereto, in which case the movement of the leading generator of the conical tip of the tool requires to take place in a similarly inclined plane extending transversely to the longitudinal axis of the pocket.

Although the invention has been described particularly in relation to the formation of a pocket which is generally V-shaped in cross-section, it is equally applicable to the formation of any other form of pocket having sloping longitudinal sides and a flat transverse end face. For example, the portion of the cutting element to be received in the pocket may be in the form of a triangle with the apex of the triangle removed to provide a flat surface. In this case the pocket will be formed with a correspondingly shaped flat elongate bottom surface. This surface may have parallel longitudinal sides or converging sides, depending on the configuration required for the body of matrix material which supports the cutting element. Where such a flat bottom to the pocket is required, this may be formed by several longitudinal passes of the conical tool along the pocket at different transverse positions.

I claim:

1. A method of making a mould for use in the manufacture of a bit body by a powder metallurgy process, the method comprising the steps of forming a hollow mould in the configuration of at least a portion of the outer surface of the bit body, and then forming in the interior surface of the mould a plurality of elongate pockets, each of which pockets is at least partly to receive a portion of a thermally stable cutting element, which portion has sloping longitudinal sides and a flat transverse front face, characterised in that each said pocket is machined from the mould material by means of a conical tool rotating about its axis, said axis being inclined to the perpendicular in a plane containing the required longitudinal axis of the pocket, a main elongate part of the pocket then being formed by translatory movement of the tool longitudinally thereof, and the pocket being formed with a flat transverse end face by translatory movement of the tool transversely of the longitudinal axis of the pocket.

2. A method according to claim 1, wherein each elongate pocket is of generally V-section, so as at least partly to receive a generally triangular cross-section portion of a thermally stable cutting element.

3. A method according to claim 1, wherein the axis of rotation of the tool is inclined to the perpendicular at an angle substantially equal to the cone semi-angle of the tool so that a leading generator of the cone is substantially perpendicular to the surface of the mould, whereby the flat end face of the pocket, when formed by said transverse movement of the tool, also extends substantially at right angles to the mould surface.

4. A method according to claim 2, wherein the tool has a cone semi-angle of 26.565° and is inclined at a similar angle to the perpendicular in a plane containing the required longitudinal axis of the pocket.

5. A method according to claim 1, and including the further steps of locating thermally stable preforms in the pockets adjacent the flat end faces thereof, packing the mould with powdered matrix-forming material, and then infiltrating the material with a metal alloy in a furnace so as to form a hard matrix.

* * * * *